US012695650B2

(12) United States Patent (10) Patent No.: US 12,695,650 B2

Lim et al. (45) Date of Patent: Jul. 28, 2026

(54) RECEIVER DEVICE AND SKEW ADJUSTING METHOD

(71) Applicant: SAMSUNG ELECTRONICS CO., LTD., Suwon-si (KR)

(72) Inventors: Sukgyun Lim, Suwon-si (KR); Soojoo Lee, Suwon-si (KR); Hyunwook Lim, Suwon-si (KR); Keun-Ho Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 18/824,431

(22) Filed: Sep. 4, 2024

(65) Prior Publication Data

US 2025/0279913 A1 Sep. 4, 2025

(30) Foreign Application Priority Data

Feb. 29, 2024 (KR) ........................ 10-2024-0030182

(51) Int. Cl.
  *H04L 25/02* (2006.01)
  *G06F 1/10* (2006.01)
  *H04L 25/14* (2006.01)

(52) U.S. Cl.
  CPC ............ *H04L 25/0272* (2013.01); *G06F 1/10* (2013.01); *H04L 25/14* (2013.01)

(58) Field of Classification Search
  CPC .... G06F 1/10; H04B 1/12; H04B 1/16; H04L 7/0041; H04L 25/0272; H04L 7/0079; H04L 7/033; H04L 7/041; H04L 25/14
  See application file for complete search history.

(56) References Cited

U.S. PATENT DOCUMENTS

| | | | |
|---|---|---|---|
| 10,181,940 B2 | 1/2019 | Kil | |
| 10,284,361 B2 | 5/2019 | Chiueh et al. | |
| 10,419,246 B2 | 9/2019 | Duan et al. | |
| 10,972,317 B2 | 4/2021 | Seno | |
| 11,018,658 B1 | 5/2021 | Jeon | |
| 11,070,350 B1 | 7/2021 | Min | |
| 11,327,914 B1 * | 5/2022 | Ying | H04L 7/0334 |
| 2015/0271037 A1 * | 9/2015 | Wiley | H04L 25/0272 |
| | | | 370/252 |
| 2017/0005781 A1 | 1/2017 | Kil | |
| 2018/0062883 A1 | 3/2018 | Duan et al. | |
| 2018/0323953 A1 | 11/2018 | Chiueh et al. | |
| 2019/0273638 A1 | 9/2019 | Seno | |
| 2021/0211266 A1 | 7/2021 | Min | |
| 2021/0367749 A1 * | 11/2021 | Lee | H04L 25/4917 |
| 2023/0170997 A1 | 6/2023 | Park et al. | |

FOREIGN PATENT DOCUMENTS

KR 10-2021-0088808 A 7/2021

* cited by examiner

*Primary Examiner* — Dac V Ha

(74) *Attorney, Agent, or Firm* — Sughrue Mion, PLLC

(57) ABSTRACT

A receiver device includes: a decoder configured to: generate differential signals based on phase signals having different phases, and generate a symbol value based on the differential signals; a code calculator configured to: compare the symbol value with a reference value, and based on a result of comparing the symbol value with the reference value, generate a delay code; and a recovery circuit configured to: generate a recovery data by recovering the phase signals, and based on the delay code, delay the recovery data.

20 Claims, 14 Drawing Sheets

| Wire State | Wire Amplitude | | | Receiver diff input voltage | | | Receiver digital input | | |
|---|---|---|---|---|---|---|---|---|---|
| | DAT_A | DAT_B | DAT_C | DAB | DBC | DCA | DIF1 | DIF2 | DIF3 |
| +x | 3/4 V | 1/4 V | 1/2 V | +1/2 V | -1/4 V | -1/4 V | 1 | 0 | 0 |
| -x | 1/4 V | 3/4 V | 1/2 V | -1/2 V | +1/4 V | +1/4 V | 0 | 1 | 1 |
| +y | 1/2 V | 3/4 V | 1/4 V | -1/4 V | +1/2 V | -1/4 V | 0 | 1 | 0 |
| -y | 1/2 V | 1/4 V | 3/4 V | +1/4 V | -1/2 V | +1/4 V | 1 | 0 | 1 |
| +z | 1/4 V | 1/2 V | 3/4 V | -1/4 V | -1/4 V | +1/2 V | 0 | 0 | 1 |
| -z | 3/4 V | 1/2 V | 1/4 V | +1/4 V | +1/4 V | -1/2 V | 1 | 1 | 0 |

RECEIVER DEVICE AND SKEW ADJUSTING METHOD

CROSS-REFERENCE TO RELATED APPLICATION

This application is based on and claims priority under 35 U.S.C. § 119 to Korean Patent Application No. 10-2024-0030182, filed on Feb. 29, 2024, in the Korean Intellectual Property Office, the entire contents of which is incorporated herein by reference.

BACKGROUND

1. Field

The disclosure relates to a receiver device and a skew adjusting method.

2. Description of Related Art

Recently, various types of electronic devices have been widely used. Electronic devices provide functions depending on the operations of various electronic circuits of the electronic devices. An electronic device may operate independently or may operate while communicating with other electronic devices. Electronic devices may include transmitters and receivers to communicate with other electronic devices.

A receiver of an electronic device can receive data from a transmitter in another electronic device. The receiver may recover a clock signal from received data and employ a 'clock and data recovery' (CDR) circuit that can recover data based on the recovered clock signal. The CDR circuit can be useful in reducing the complexity of a communication channel between the transmitter and a receiver and improving communication speed.

SUMMARY

Provided are a receiver device and a skew adjusting method capable of reducing the complexity of a communication channel and improving the communication speed.

According to an aspect of the disclosure, a receiver device includes: a decoder configured to: generate differential signals based on phase signals having different phases, and generate a symbol value based on the differential signals; a code calculator configured to: compare the symbol value with a reference value, and based on a result of comparing the symbol value with the reference value, generate a delay code; and a recovery circuit configured to: generate a recovery data by recovering the phase signals, and based on the delay code, delay the recovery data.

According to an aspect of the disclosure, a skew adjusting method includes: receiving a trio signal; based on a reference value in a preamble section of the trio signal, determining a delay code; determining whether the trio signal is a continuous clock mode; and based on the trio signal that is the continuous clock mode, adjusting the reference value.

According to an aspect of the disclosure, a skew adjusting method includes: receiving data from a transmitter; determining symbol values based on the data; determining whether the symbol values coincide with a reference value; based on a result of determining whether the symbol values coincide with a reference value, generating a delay code; decreasing the delay code based on the symbol values that do not coincide with the reference value, and increasing the delay code based on the symbol values that coincide with the reference value.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a receiver according to an embodiment;

FIG. 4 illustrates an operation of a receiver circuit according to an embodiment;

FIG. 8 illustrates an operation of a receiver in a non-continuous clock mode according to an embodiment;

FIG. 9 illustrates an operation of a receiver in a non-continuous clock mode according to an embodiment;

FIG. 12 illustrates an electronic system including a receiver according to an embodiment;

DETAILED DESCRIPTION

Figure 1:
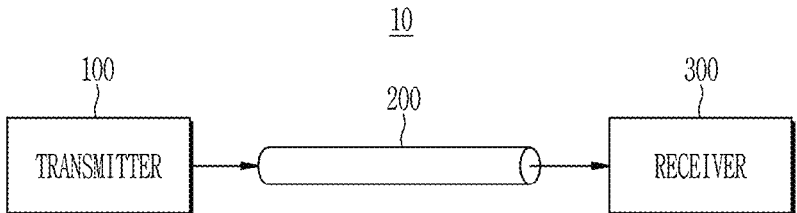
FIG. 1 illustrates an electronic system according to an embodiment.

In the following detailed description, only certain the embodiment of the disclosure have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. In a flowchart described with reference to the drawings, an order of operations may be changed, several operations may be merged, some operations may be divided, and specific operations may not be performed.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one constituent element from other constituent elements.

The description merely illustrates the principles of the disclosure. Those skilled in the art will be able to devise one or more arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Terms used in the disclosure are used only to describe a specific embodiment, and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the disclosure. Terms defined in a general dictionary among the terms used in the disclosure may be interpreted with the same or similar meaning as a contextual meaning of related technology, and unless clearly defined in the disclosure, it is not interpreted in an ideal or excessively formal meaning. In some cases, even terms defined in the disclosure cannot be interpreted to exclude embodiments of the disclosure.

In one or more embodiments of the disclosure described below, a hardware approach is described as an example. However, since the one or more embodiments of the disclosure include technology that uses both hardware and software, the various embodiments of the disclosure do not exclude a software-based approach.

In addition, in the disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with 'more than', a condition described as 'less than or equal to' may be replaced with 'less than', and a condition described as 'more than or equal to and less than' may be replaced with 'more than and less than or equal to'.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. As an additional example, the expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

FIG. 1 illustrates an electronic system according to an embodiment.

Referring to FIG. 1, an electronic system 10 may include a transmitter 100 and a receiver 300. The transmitter 100 and the receiver 300 may be implemented or be included in different semiconductor devices (or electronic devices), respectively, or may be implemented to be included in one semiconductor device.

In the electronic system 10, a communication channel 200 may be established between the transmitter 100 and the receiver 300. The transmitter 100 may transmit data to the receiver 300 through the communication channel 200.

In an embodiment, the transmitter 100 may be a host, and the receiver 300 may be a memory device. The host (the transmitter 100) may include a central processing unit (CPU), a graphics processing unit (GPU), an application processor (AP), or the like. The memory device may include a volatile memory, a non-volatile memory, or the like.

In an embodiment, the transmitter 100 may be a host, and the receiver 300 may be a peripheral device. The peripheral device may include a display device, a camera device, a communication apparatus, a storage device, or the like. However, the embodiment is not necessarily limited thereto, and the transmitter 100 and the receiver 300 may be implemented as various elements that exchange data through the communication channel 200. In one embodiment, the receiver 300 may transmit data to the transmitter 100, and the transmitter 100 may receive data from the receiver 300.

In an embodiment, the communication channel 200 may include three wires of the physical layer C-PHY of the protocol defined by the mobile industry processor interface (MIPI) alliance. The wires may be configured to transfer data having different phases and polarities. For example, the host (the transmitter 100) may generate six available data by combining three phases and two polarities. The host and a device (e.g., a display device, a camera device, or the like) may exchange data and control information by using wires of the communication channel 200.

In an embodiment, the communication channel 200 may be implemented as a wired channel for wired communication, such as a copper wire on a PCB substrate. In an embodiment, the communication channel 200 may be implemented as a wireless channel for wireless communication.

In an ideal case, data from the transmitter 100 to the receiver 300 should be transmitted lossless, but in reality, this is not the case. Due to the transfer function due to the comparatively long length of the communication channel 200, material properties of the communication channel 200, or the like, the digital pulse signal having a clear outline at the transmitter 100 may be dispersed or spread in Gaussian form when reaching the receiver 300. Accordingly, the receiver 300 may recover and use the data having passed through the communication channel 200. In an embodiment, the signal transmitted by the transmitter 100 to the receiver 300 may be a clock embedded signal. That is, the signal transmitted by the transmitter 100 to the receiver 300 may include clock information.

The receiver 300 may generate a differential signal from the received data. Based on the differential signal, the receiver 300 may generate data signal and a clock signal. The data signal and the clock signal generated by the receiver 300 may include 'skew.' Skew is the time delta between the actual and expected arrival time of a clock signal. Skew can be either extrinsic or intrinsic. The latter is internal to the driver (generator circuitry) and defined as the difference in propagation delays between the device outputs.

The receiver 300 may perform a skew calibration, and may generate a 'delay code' for compensating the skew. Based on the data signal and the clock signal, the receiver 300 may determine the delay code corresponding to the skew. The receiver 300 may delay the data signal based on the delay code. Accordingly, the receiver 300 may synchronize the data signal and the clock signal.

In the related art, a conventional electronic system may store the delay code in a non-volatile memory, and may delay the data signal based on the delay code. Since these delay codes are conservatively determined so that the receiver can normally read the data signal despite changes in various environments, unnecessary timing budget may occur and speed may be delayed.

However, according to the embodiments of the disclosure, the electronic system 10 may determine an optimal delay code in real time, and may reduce the timing budget by delaying the data signal based on the delay code. Accordingly, the speed may be improved and the current consumption may be reduced.

Figure 2:
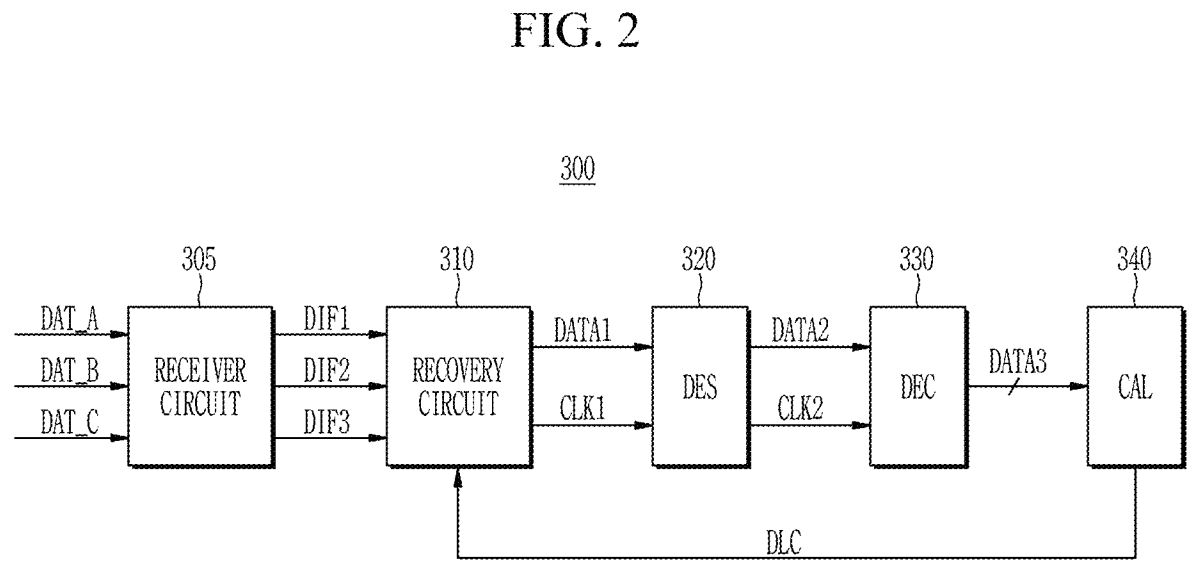

FIG. 2 illustrates a receiver according to an embodiment. Referring to FIG. 2, the receiver 300 according to an embodiment may include a receiver circuit 305, a recovery circuit 310, a deserializer (DES) 320, a decoder (DEC) 330, and a code calculator (CAL) 340. The receiver 300 may receive signals DAT_A, DAT_B, and DAT_C, and may perform operations based on the signals DAT_A, DAT_B, and DAT_C.

In some embodiments, the signals DAT_A, DAT_B, and DAT_C may have different phases. For example, the signals DAT_A, DAT_B, and DAT_C may be understood as being a first phase signal, a second phase signal, and a third phase signal, respectively. In an embodiment, the first to the third phase signals may be represented by using the states of +1, 0, −1. The states of +1, 0, −1 may mean three voltage levels +V, 0, −V, or three voltage levels +V, +V/2, 0, or three voltage levels +¼V, +½V, +¾V, or three currents I, 0, −I, but is not necessarily limited thereto.

The receiver circuit 305 may generate differential signals DIF1 to DIF3 based on the signals DAT_A, DAT_B, and DAT_C. For example, the receiver circuit 305 may generate the differential signals DIF1 to DIF3 based on an amplitude difference between two signals among the signals DAT_A, DAT_B, and DAT_C. The configuration in which the receiver circuit 305 generates the differential signals DIF1 to DIF3 will be described later with reference to FIG. 3 to FIG. 5.

The recovery circuit 310 may generate a first data DATA1 and a first clock CLK1 from the differential signals DIF1 to DIF3. For example, the recovery circuit 310 may include a data circuit configured to generate the first data DATA1 from the differential signals DIF1 to DIF3 and a clock circuit configured to generate the first clock CLK1 from the differential signals DIF1 to DIF3. The recovery circuit 310 may further include a delay circuit connected to the data circuit and configured to delay the first data DATA1. In one embodiment, the delay circuit may be disposed outside the recovery circuit 310. The recovery circuit 310 may transfer the first data DATA1 and the first clock CLK1 to the deserializer 320.

The deserializer 320 may receive the first data DATA1 and the first clock CLK1. The deserializer 320 may deserialize the first data DATA1 based on the first clock CLK1. The deserializer 320 may generate a second data DATA2 by deserializing the first data DATA1. For example, the first data DATA1 may be a bit sequence, and the second data DATA2 may be a plurality of bit values included in the bit sequence. The deserializer 320 may transfer the second data DATA2 and a second clock CLK2 to the decoder 330. In an embodiment, the second clock CLK2 may substantially be the same as the first clock CLK1. In an embodiment, the recovery circuit 310 may transfer the first clock CLK1 to the decoder 330 as the second clock CLK2.

In one embodiment, the deserializer 320 may be implemented as a serial/parallel converter such as a serializer-deserializer (SerDes). The deserializer 320 may include at least one of a parallel-in serial-out (PISO) block or a serial-in parallel-out (SIPO) block.

The decoder 330 may generate third data DATA3, based on the second data DATA2 and the second clock CLK2. Specifically, the decoder 330 may determine a wire state based on the second data DATA2. The decoder 330 may generate symbol value based on the transition of the wire state. The decoder 330 may transfer the generated symbol values to the code calculator 340 as the third data DATA3.

In an embodiment, the decoder 330 may be a wire state decoder, and the symbol value may include a flip symbol, a rotation symbol, and a polarity symbol of a protocol defined by the MIPI alliance.

The code calculator 340 may generate the delay code DLC based on the third data DATA3. For example, the code calculator 340 may compare a reference value and the third data DATA3. The code calculator 340 may increase the delay code DLC when the reference value and the third data DATA3 coincide with each other (in other words, the reference value has the same value as the third data DATA3), and may decrease the delay code DLC when the reference value and the third data DATA3 do not coincide with each other (in other words, the reference value does not have the same value as the third data DATA3). The code calculator 340 may determine the delay code DLC by using a code fixing method, a binary search code method, a counting method, or the like. The operation of the code calculator 340 will be described later with reference to FIG. 7 to FIG. 10. The code calculator 340 may transfer the delay code DLC to the recovery circuit 310.

The receiver 300 may further include a demapper configured to generate the data signal (e.g., fourth data) to be used for an operation of the receiver 300 based on the third data DATA3. That is, the demapper may receive the third data DATA3 from the decoder 330.

In one embodiment, the code calculator 340 of the receiver 300 may be included in a physical layer (PHY) or a link layer. For example, the recovery circuit 310 and the deserializer 320 of the receiver 300 (for example, shown in FIG. 2) may be included in a physical layer, and the decoder 330 and the code calculator 340 may be included in the link layer. For example, the recovery circuit 310, the deserializer 320, and the code calculator 340 of the receiver 300 may be included in a physical layer, and the decoder 330 may be included in a link layer. However, the embodiment is not necessarily limited thereto, but components of the receiver 300 may be implemented to be disposed in various layers. The receiver 300 may further include a transaction layer, a software layer, or the like.

The recovery circuit 310 may delay the first data DATA1 based on the delay code DLC, to synchronize the first data DATA1 and the first clock CLK1. The receiver 300 may minimize the skew of the first data DATA1 and the first clock CLK1 by using the delay code DLC, and the speed may be improved by reducing the timing budget, and the current consumption may be reduced.

Figure 3:
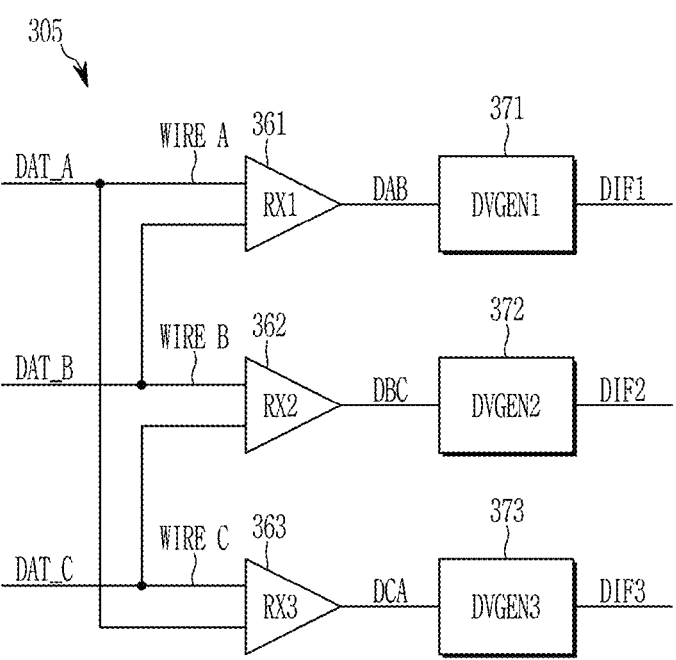
FIG. 3 illustrates an operation of a receiver circuit according to an embodiment.
Figure 5:
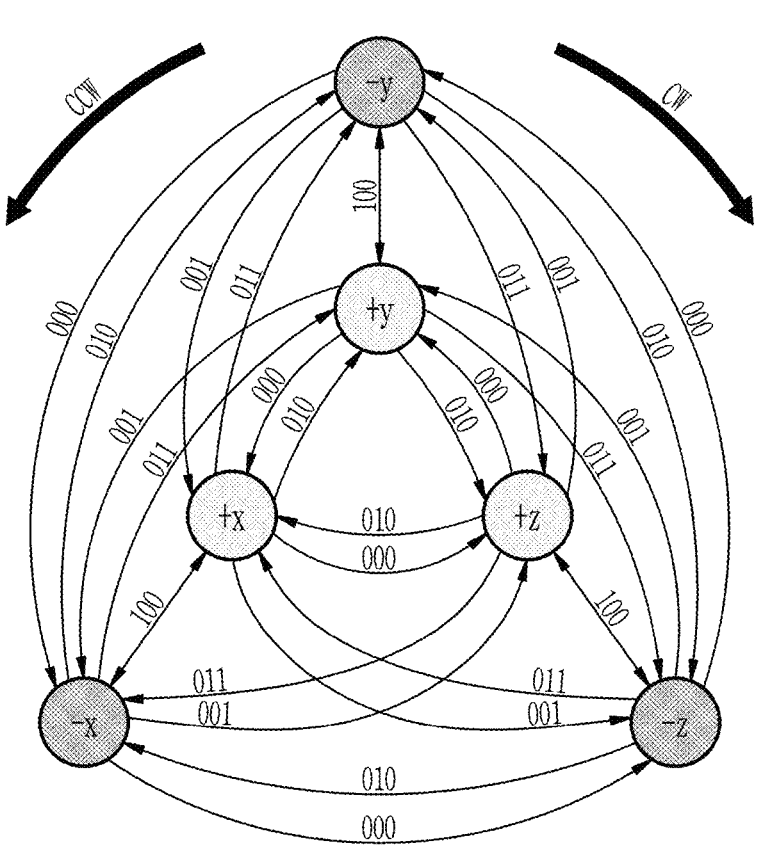
FIG. 5 illustrates an operation of a decoder according to an embodiment.

FIG. 3 and FIG. 4 illustrate operations of a receiver circuit according to an embodiment. FIG. 5 illustrates operations of a decoder according to an embodiment.

Referring to FIG. 3, the receiver circuit 305 according to an embodiment may include a plurality of differential receivers (RX1 to RX3) 361 to 363 and a plurality of digital value generators (DVGEN1 to DVGEN3) 371 to 373.

A plurality of differential receivers 361 to 363 may receive the signals DAT_A, DAT_B, and DAT_C from a transmitter (e.g., 100 of FIG. 1). For example, transmitter may generate the signals DAT_A, DAT_B, and DAT_C based on phases and polarities of three states such as high, middle, and low (or +1, 0, −1). In one embodiment, three states may be represented by using voltage levels +V, 0, and −V, or voltage levels +V, +V/2, and 0, or voltage levels +¾V, +½V, and +¼V, or the like. In an embodiment, the states may be represented by using the current (e.g., +I, 0, −I), instead of voltage level. The transmitter may transmit the signals DAT_A, DAT_B, and DAT_C to the receiver circuit 305, while changing the states.

The receiver circuit 305 may receive the signals DAT_A, DAT_B, and DAT_C from the transmitter through three wires (wire A, wire B, and wire C). Depending on the wire state encoded by the transmitter, the voltage amplitudes of the wires (wire A, wire B, and wire C) may be different. The wire state may include +x, −x, +y, −y, +z, and −z. The wires (wire A, wire B, and wire C) may have a voltage amplitude corresponding to each wire state, and in other words, in different wire states, the wire A, wire B, and wire C may have voltage amplitudes of different combinations. For example, when the wire state is +x, the voltage amplitudes of the wire A, wire B, and wire C may be ¾V, ¼V, and ½V, respectively. When the wire state is −y, the voltage amplitudes of the wire A, wire B, and wire C may be ½V, ¼V, and ¾V, respectively.

The plurality of differential receivers 361 to 363 may generate differential signals DAB, DBC, and DCA, based on the signals DAT_A, DAT_B, and DAT_C. For example, a first differential receiver 361 may generate a first differential signal DAB based on the amplitude difference (A−B) of the wire A and wire B. A second differential receiver 362 may generate a second differential signal DBC based on the amplitude difference (B−C) of the wire B and wire C. A third differential receiver 363 may generate a third differential signal DCA based on the amplitude difference (C−A) of the wire C and wire A. When the wire state of +x is taken as an example, the first differential receiver 361 may output +½V as the first differential signal DAB, and the second differential receiver 362 may output −¼V as the second differential signal DBC, and the third differential receiver 363 may output −¼V as the third differential signal DCA.

A plurality of digital value generators 371 to 373 may output digital values DIF1 to DIF3 based on the differential signals DAB, DBC, and DCA of the plurality of differential receivers 361 to 363. For example, the plurality of digital value generators 371 to 373 may include a direct current (DC) comparator. The DC comparator may output one (1) when the differential signals DAB, DBC, and DCA have a positive voltage, and may output zero (0) when they have a negative voltage.

A first digital value generator 371 may output 1 in response to +½V of the first differential receiver 361, and second and third digital value generators 372 and 373 may output 0 in response to −¼V of the second and third differential receivers 362 and 363. Similarly, a digital value generator 371, 372, or 373 may output 1 in response to +¼V of a differential receiver 361, 362, or 363, and may output 0 in response to −½V of the differential receiver 361, 362, or 363. The plurality of digital value generators 371 to 373 may transfer the digital values DIF1 to DIF3 to the recovery circuit (e.g., 310 of FIG. 2).

Referring to FIG. 3 and FIG. 4, the receiver circuit 305 according to an embodiment may receive signals through the wire A, the wire B, and the wire C. Signals may have different amplitudes depending on the wire state determined based on the encoding of the transmitter. When the wire state of −x is taken as an example, the amplitude of wire A may be ¼V, and the amplitude of wire B may be ¾V, and the amplitude of wire C may be ½V.

The first differential receiver 361 may output −½V as the first differential signal DAB, based on the differential signal of the wire A and wire B. The second differential receiver 362 may output +¼V as the second differential signal DBC based on the differential signal of the wire B and wire C. The third differential receiver 363 may output +¼V as the third differential signal DCA based on the differential signal of the wire C and wire A. The plurality of differential receivers 361 to 363 may transfer the differential signals DAB, DBC, and DCA to the plurality of digital value generators 371 to 373.

The first digital value generator 371 may output 0 as the digital value DIF1 based on the first differential signal DAB of −½V. The second and third digital value generators 372 and 373 may output 1 as digital values DIF2 and DIF3 based on the second and third differential signals DBC and DCA of +¼V. The digital values DIF1 to DIF3 may pass through a recovery circuit (e.g., 310 of FIG. 2) and a deserializer (e.g., 320 of FIG. 2), and may be input to a decoder as a second data (e.g., DATA2 of FIG. 2).

The decoder may determine the wire state based on the second data. For example, as shown in FIG. 4, when the digital values DIF1 to DIF3 are 1, 0, 0, the decoder may determine the wire state as +x. When the digital values DIF1 to DIF3 are 1, 0, 1, the decoder may determine the wire state as −y.

The decoder may determine transition (or change) of the wire state. When the wire state transitions (or changes), the decoder may calculate a symbol value. The symbol value may include a flip symbol, a rotation symbol, and a polarity symbol. For example, the decoder may determine that the wire state has changed from +x to −y, and may calculate the symbol value based on the transition of the wire state.

FIG. 5 illustrates the states +x, −x, +y, −y, +z, and −z of three wires and transitions of the states. Referring to FIG. 5, center may represent positive polarity the states +x, +y, and +z, and peripheral portion may represent negative polarity the states −x, −y, and −z. The wires may have different states based on signals encoded by the transmitter. The states may rotate in a clockwise direction CW or a counterclockwise direction CCW.

The transitions of the states may be represented by using three (3) bits symbol values (i.e., 000, 001, 010, 011, or 100). A first bit among the 3 bits symbol value may be a flip symbol, a second bit may be a rotation symbol, and a third bit may be a polarity symbol.

The flip symbol may represent whether a transition between adjacent two states (e.g., a current state and a subsequent state) only includes the change of polarity. For example, when the current state is +x and the subsequent state is −x, the flip symbol may represent 1. When the flip symbol represents 1, the rotation symbol and the polarity symbol may be ignored, or set to 0.

The rotation symbol may represent a direction of rotation corresponding to the transition between adjacent two states. For example, when a state transition from the current state to the subsequent state exists in the clockwise direction CW, the rotation symbol may represent 1. When a state transition from the current state to the subsequent state exists in the counterclockwise direction CCW, the rotation symbol may represent 0.

The polarity symbol may represent the transition between adjacent two states includes the change of polarity. For example, when polarities of the current state and the subsequent state are different, the polarity symbol may represent 1. When polarities of the current state and the subsequent state are the same, the polarity symbol may represent 0.

As such, when the wire state transitions, the decoder may calculate symbol values, as shown in FIG. 5. For example, when the wire state changes from +x to −y, the decoder may determine the symbol value as 3. The symbol value of 3 may correspond to binary bits 011, and here, the flip symbol may be 0, the rotation symbol may be 1, and the polarity symbol may be 1.

In an embodiment, the decoder may receive data of 21 bits from the deserializer, and may calculate seven symbol values based on the data of the 21 bits. The symbol values may include a flip symbol of 7 bits, a rotation symbol of 7 bits, and a polarity symbol of 7 bits. For example, the decoder may determine the wire state of '3264513' based on the data of the 21 bits. The decoder may calculate the symbol values based on the wire state of the '3264513'. For example, when the wire state is changed from 3 to 2, the decoder may determine the symbol value as 3 (binary bit 011). In addition, when the wire state is changed from 2 to 6, the decoder may determine the symbol value as 3. As such, the decoder may obtain the symbol values of '3333333' based on the wire state of the '3264513'. The decoder may transfer the symbol values to a code calculator (e.g., 340 of FIG. 2) as a third data (e.g., DATA3 of FIG. 2).

The code calculator may compare the symbol values and the reference value. In an embodiment, the reference value may be '3333333'. When the seven symbol values are all 3, the code calculator may determine that the symbol values and the reference value coincide with each other. When at least one of the seven symbol values is not 3, the code calculator may determine that the symbol values does not coincide with the reference value.

The code calculator may decrease the delay code when the symbol values and the reference value do not coincide with each other. When the symbol values and the reference value coincide with each other, the code calculator may increase or fix the delay code. When the code calculator increases the delay code, the code calculator revert to a delay code prior to the currently set delay code.

In an embodiment, the code calculator may increase or decrease the delay code by 1 bit. In an embodiment, the code calculator may increase the delay code by a multiple of 2 or decrease it by a multiple of ½ based on the binary search code method. The code calculator may determine the decreased delay code as a final code.

Figure 6:
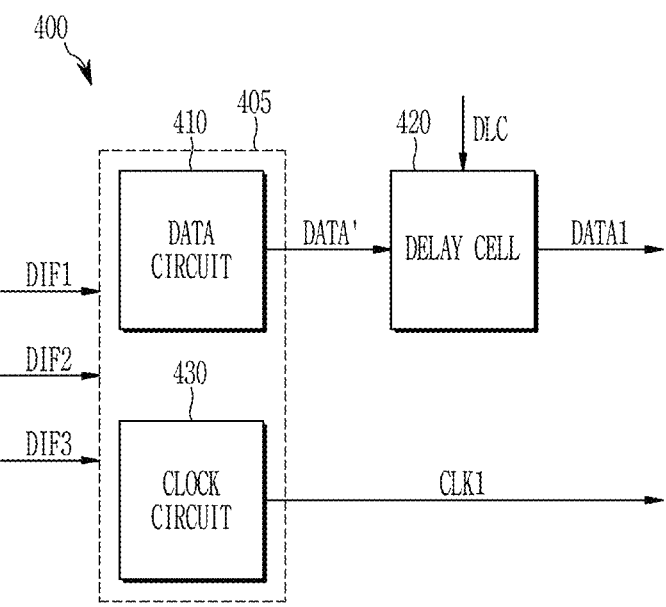
FIG. 6 illustrates a recovery circuit according to an embodiment.

FIG. 6 illustrates a recovery circuit according to an embodiment. Referring to FIG. 6, a recovery circuit 400 according to an embodiment may receive the digital values DIF1 to DIF3. The recovery circuit 400 may generate the first data DATA1 and the first clock CLK1 based on the digital values DIF1 to DIF3.

The recovery circuit 400 may be a clock and data recovery circuit (CDR circuit). The recovery circuit 400 may include a data circuit 410, a delay cell 420, and a clock circuit 430. The data circuit 410 and the clock circuit 430 may be represented as a data clock circuit 405.

The data circuit 410 may generate recovery data DATA' based on the digital values DIF1 to DIF3. The data circuit 410 may transfer the recovery data DATA' to the delay cell 420.

The delay cell 420 may delay the recovery data DATA' based on the delay code DLC. The delay code DLC may be controlled by a code calculator (e.g., 340 of FIG. 2). In an embodiment, when the delay code DLC increases, the delay cell 420 may increase the delay time of the recovery data DATA', and when the delay code DLC decreases, the delay cell 420 may decrease the delay time of the recovery data DATA'. However, the embodiment is not necessarily limited thereto.

The delay cell 420 may output the first data DATA1 that has delayed the recovery data DATA'. The delay cell 420 may transfer the first data DATA1 to a deserializer (e.g., 320 of FIG. 2).

The clock circuit 430 may generate the first clock CLK1 based on the digital values DIF1 to DIF3. That is, the clock circuit 430 may extract the embedded clock signal. The clock circuit 430 may transfer the first clock CLK1 to the deserializer.

In an embodiment, the recovery circuit 400 may be implemented to include a component configured to search and fix the phase and frequency of the clock signal through the feedback loop, such as phase-locked loop (PLL) or delay-locked loop (DLL). The recovery circuit 400 may include a phase detector for recovering the clock signal.

Figure 7:
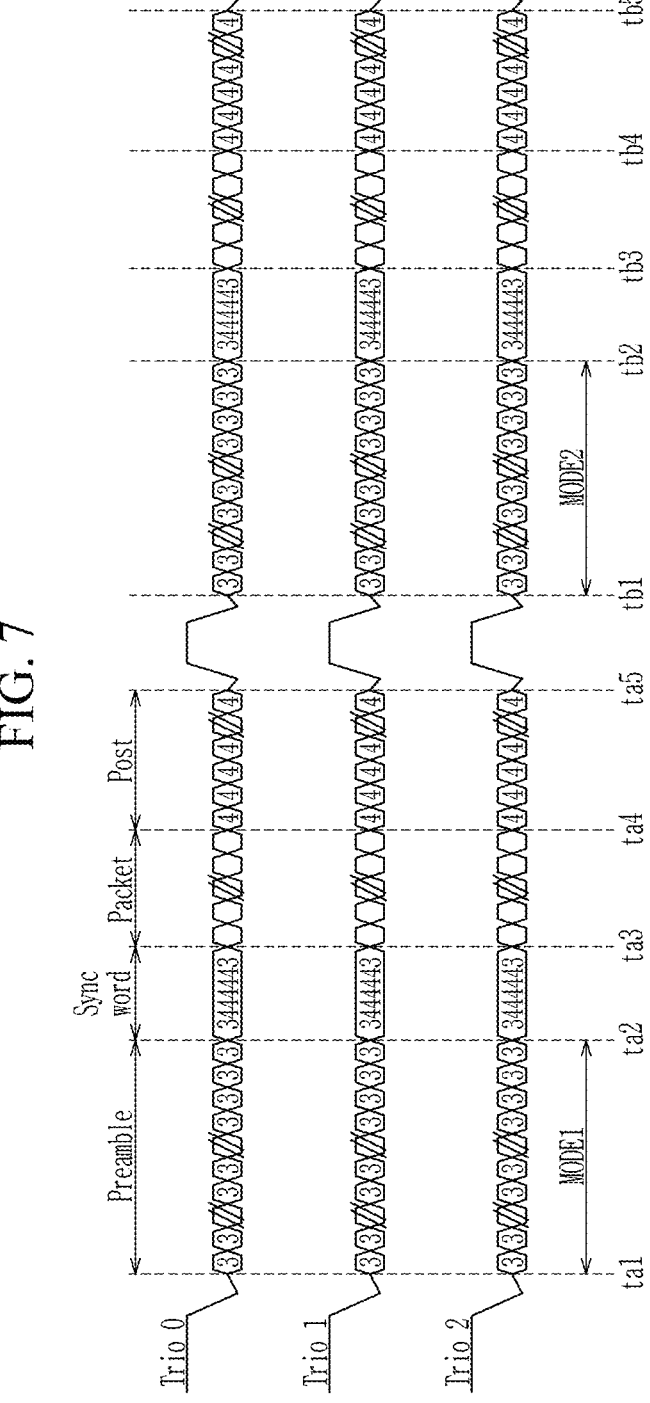
FIG. 7 illustrates an operation of a receiver in a non-continuous clock mode according to an embodiment.
Figure 8:
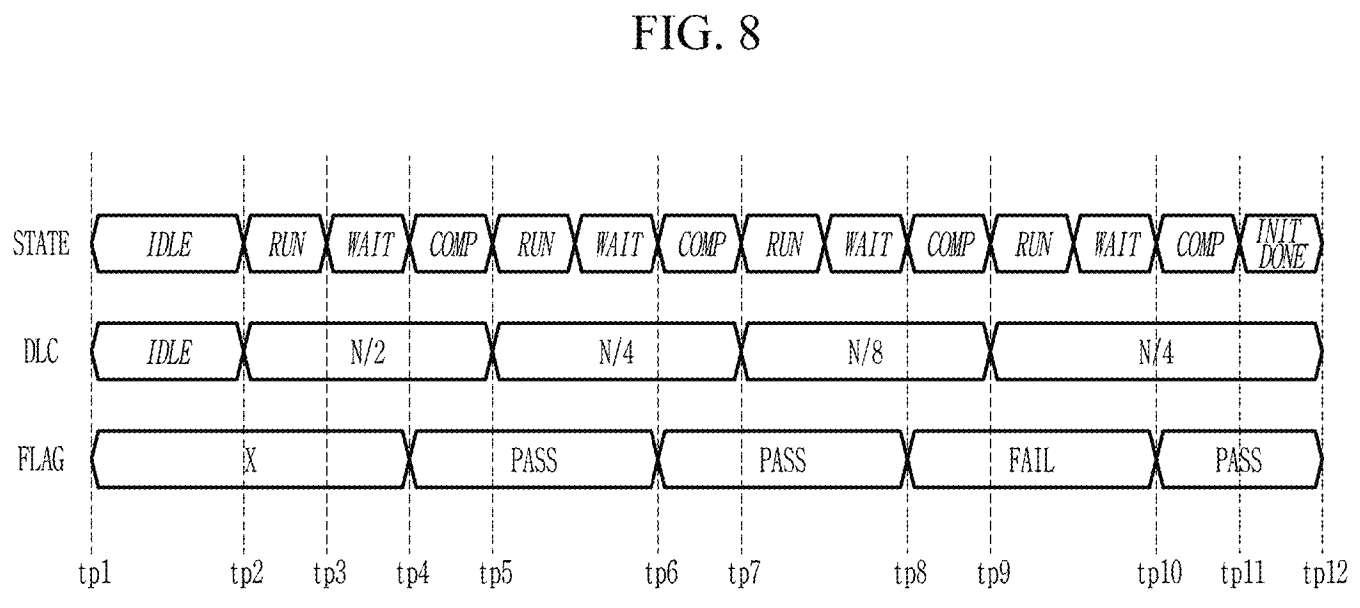
Figure 9:
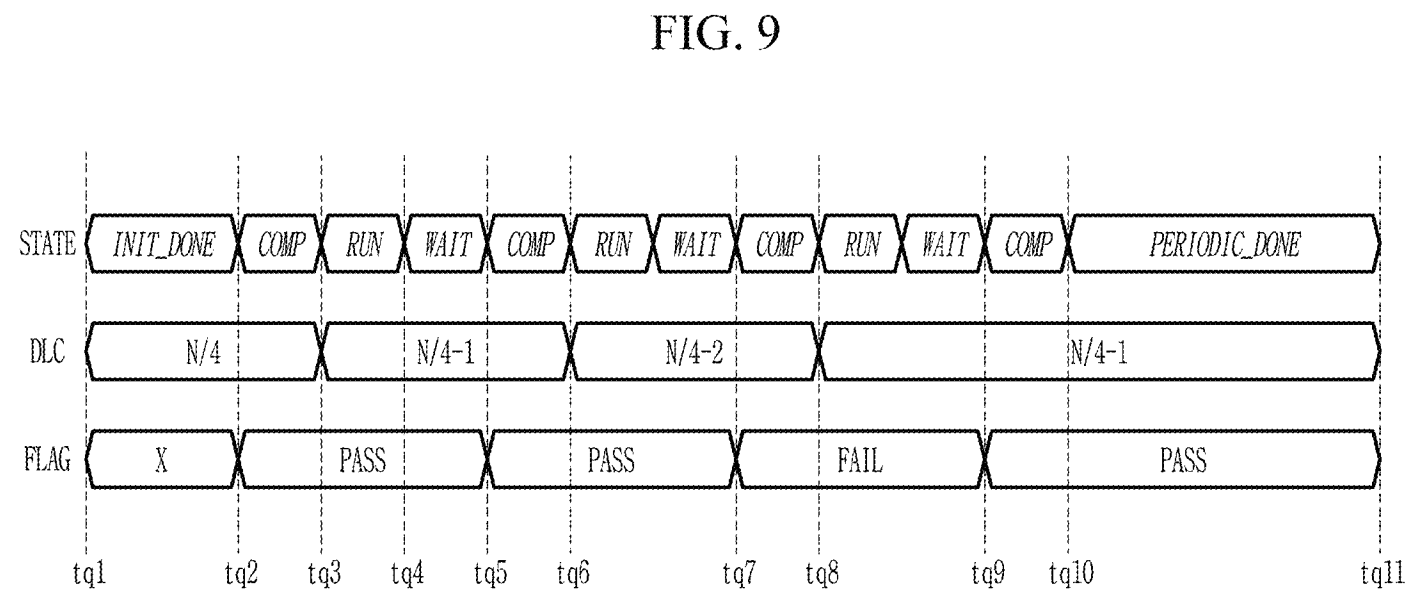

FIG. 7 to FIG. 9 illustrate an operation of a receiver in a non-continuous clock mode, respectively, according to an embodiment.

Referring to FIG. 7, the transmitter according to an embodiment may transmit trio signals Trio 0, Trio 1, and Trio 2 to the receiver. The transmitter may generate the trio signals Trio 0, Trio 1, and Trio 2 by combining three phases and two polarities.

The receiver may receive the trio signals Trio 0, Trio 1, and Trio 2 through the wires. Each of the trio signals Trio 0, Trio 1, and Trio 2 may include three signals. When FIG. 3 is taken as an example, the signals DAT_A, DAT_B, and DAT_C may mean one trio signal.

The transmitter may transmit the trio signals Trio 0, Trio 1, and Trio 2 to the receiver in a non-continuous clock mode. For example, the trio signals Trio 0, Trio 1, and Trio 2 may exchange data during a time period ta1 to ta5 and a time period tb1 to tb5. The time period ta1 to ta5 and the time period tb1 to tb5 exchanging data may be understood as high-speed transaction sections. For example, the time period ta1 to ta5 may be a first high-speed transaction section, and the time period tb1 to tb5 may be a second high-speed transaction section. In addition, during a time period ta5 to tb1, the receiver may be in a preparation mode (or an idle mode). The preparation mode may be understood as a standby mode for transmitting and receiving data.

The trio signals Trio 0, Trio 1, and Trio 2 may include a preamble section, a sync word section, a packet section, a post section, or the like, in the time period ta1 to ta5 and the time period tb1 to tb5 exchanging data.

The preamble section may be a section for performing a clock training by using a preamble pattern (or a training pattern). For example, the receiver may perform the skew calibration based on data received by the preamble section. The transmitter may transmit data such as '3333333' in the preamble section. The receiver may determine the delay code for compensating the skew through the skew calibration. The receiver may perform a unit interval (UI) detection in the preamble section.

The sync word section may be a section for indicating that the packet section starts. The transmitter may transmit a sync pattern in the sync word section. For example, the sync pattern may be '3444443'. The receiver may confirm a starting point of a subsequent packet section through the sync word section.

The packet section may be a section for transmitting and receiving data. In one embodiment, in the packet section, data may be transmitted and received by using a display serial interface (DSI) method, or a camera serial interface (CSI) method, or the like.

The post section may be a section for indicating that the packet section has ended. For example, the transmitter may transmit data such as '4444444' in the post section. When the post section has ended, the receiver may enter the preparation mode.

When the time period ta1 to ta5 is taken as an example, the trio signals Trio 0, Trio 1, and Trio 2 may have the preamble section in a time period ta1 to ta2, may have the sync word section in a time period ta2 to ta3, may have the packet section in a time period ta3 to ta4, and may have the post section in a time period ta4 to ta5.

The receiver may perform the skew calibration in the preamble section. The receiver may determine the delay code in various methods in the skew calibration. For example, the receiver may determine the delay code as a first mode MODE1 in the time period ta1 to ta2, and may determine the delay code as a second mode MODE2 in a time period tb1 to tb2. In an embodiment, the first mode and the second mode may be the same as or be different from each other. For example, each of the first mode and the second mode may be one of the code fixing method, the binary search code method, or the counting method. In an embodiment, the time period ta1 to ta5 may be an initial high-speed transaction section, and the first mode may be used in the code fixing method or the binary search code method, thereby being capable of setting the delay code rapidly.

Referring to FIG. 2 and FIG. 8, the receiver 300 according to an embodiment may determine the delay code DLC by performing the skew calibration during a time period tp1 to tp12. The time period tp1 to tp12 may be included in the preamble section. The receiver 300 may use the binary search code method, and may determine the delay code DLC based on a state STATE and a flag FLAG.

The receiver 300 may have the state STATE of the idle mode, operation mode, the standby mode, comparison mode, or the like. The idle mode may mean a state in which the receiver 300 is in standby before entering the high-speed transaction. The operation mode may mean a state in which the delay code DLC is applied to the recovery circuit 310. The standby mode may mean a state of standby for stabilization of the first data DATA1 output from the recovery circuit 310 in a delay based on the delay code DLC. The comparison mode may mean a state in which the code calculator 340 compares the symbol values and the reference value.

The code calculator 340 may generate the flag FLAG based on the comparison result. For example, when the symbol values and the reference value do not coincide with each other, the code calculator 340 may output the flag FLAG corresponding to PASS, and when the symbol values and the reference value coincide with each other, may output the flag FLAG corresponding to FAIL. However, the embodiment is not necessarily limited thereto, but when they coincide with, the flag FLAG corresponding to PASS, when they do not coincide with, the flag FLAG corresponding to FAIL may be used.

The code calculator 340 may determine the delay code DLC based on the flag FLAG. When the flag FLAG is PASS, the code calculator 340 may decrease the delay code DLC by a multiple of ½. When the flag FLAG is FAIL, the code calculator 340 may increase the delay code DLC by a multiple of 2.

The receiver 300 may be in the idle mode in a time period tp1 to tp2. In the idle mode, the receiver 300 may not receive the data, the delay code DLC may be 0, and the flag FLAG may not be generated. In a time period tp2 to tp3, the receiver 300 may determine the delay code DLC as N/2 by using the binary search code method (N is an integer that is greater than 1). In a time period tp3 to tp4, the receiver 300 may be in the standby mode for stabilization. The code calculator 340 may receive the third data DATA3 from the decoder 330, and may calculate the symbol values in a time period tp4 to tp5. The code calculator 340 may compare the symbol values and the reference value and generate the flag FLAG. The code calculator 340 may confirm that the symbol values does not coincide with the reference value, as the comparison result of the time period tp4 to tp5, and may generate the flag FLAG of PASS. The code calculator 340 may decrease the delay code DLC by a by a multiple of ½ based on the flag FLAG of PASS, to be determined as N/4. The code calculator 340 may transmit the delay code DLC to the recovery circuit 310.

The recovery circuit 310 may generate the first data DATA1 based on the delay code DLC of N/4 in the time point tp5. After the standby mode for stabilization, in a time period tp6 to tp7, the code calculator 340 may calculate the symbol values. The code calculator 340 may compare the symbol values and the reference value, confirm that the symbol values does not coincide with the reference value, as the comparison result, and may generate the flag FLAG of PASS. The code calculator 340 may decrease the delay code DLC by a by a multiple of ½ based on the flag FLAG of PASS, to be determined as N/8. The code calculator 340 may transmit the delay code DLC to the recovery circuit 310.

The recovery circuit 310 may generate the first data DATA1 based on the delay code DLC of N/8 in the time point tp7. After the standby mode for stabilization, in a time period tp8 to tp9, the code calculator 340 may calculate the symbol values. The code calculator 340 may compare the symbol values and the reference value, confirm that the symbol values and the reference value coincide with each other, as the comparison result, and may generate the flag FLAG of FAIL. The code calculator 340 may increase the delay code DLC by a multiple of 2 based on the flag FLAG of FAIL and determine it as N/4. In an embodiment, the code calculator 340 may finally determine the delay code DLC as N/8 based on the flag FLAG of FAIL. The code calculator 340 may transmit the delay code DLC to the recovery circuit 310.

The recovery circuit 310 may generate the first data DATA1 based on the delay code DLC of N/4 in the time point tp9. After the standby mode for stabilization, in a time period tp10 to tp11, the code calculator 340 may calculate the symbol values. The code calculator 340 may compare the symbol values and the reference value, confirm that the symbol values does not coincide with the reference value, as the comparison result, and may generate the flag FLAG of PASS. The code calculator 340 may confirm that the flag FLAG is changed from FAIL to PASS, and may fix the delay code DLC. The code calculator 340 may finally determine the delay code DLC as N/4 based on the flag FLAG of PASS. The receiver 300 may change the state STATE to a completion INIT_DONE at the time point tp11, and complete the delay code determining operation at the time point tp12, thereby completing the skew calibration.

Referring to FIG. 2 and FIG. 9, the receiver 300 according to an embodiment may determine the delay code DLC by performing the skew calibration during a time period tq1 to tq12. The time period tq1 to tq12 may be included in the preamble section. The receiver 300 may use the counting method, and may determine the delay code DLC based on the state STATE and the flag FLAG.

The receiver 300 may have the state STATE of the idle mode, operation mode, the standby mode, comparison mode, or the like. Regarding these operations, the description explained with reference to FIG. 8 may be equally applied, so redundant description will be omitted herein.

In a time period tq1 to tq2, the state STATE of the receiver 300 may be the completion INIT_DONE. The receiver 300 may not receive data, the delay code DLC may be N/4, and the flag FLAG may not be generated. The delay code DLC may be a code determined and stored in the previous skew calibration. However, the embodiment is not necessarily limited thereto, but the skew calibration may be performed based on predetermined delay code.

The code calculator 340 may receive the third data DATA3 from the decoder 330, and may calculate the symbol values in a time period tq2 to tq3. The code calculator 340 may compare the symbol values and the reference value and generate the flag FLAG. The code calculator 340 may confirm that the symbol values does not coincide with the reference value, as the comparison result of the time period tq2 to tq3, and may generate the flag FLAG of PASS.

The code calculator 340 may determine the delay code DLC by using the counting method. The code calculator 340 may increase or decrease the delay code DLC by a predetermined value based on the flag FLAG. For example, in the time period tq2 to tq3, the code calculator 340 may decrease the delay code DLC by 1 based on the flag FLAG of PASS, to be determined as N/4−1. The code calculator 340 may transmit the delay code DLC to the recovery circuit 310.

The recovery circuit 310 may generate the first data DATA1 based on the delay code DLC of N/4−1 in the time point tq3. After the standby mode for stabilization in a time period tq4 to tq5, in time period tq5 to tq6, the code calculator 340 may calculate the symbol values. The code calculator 340 may compare the symbol values and the reference value, confirm that the symbol values does not coincide with the reference value, as the comparison result, and may generate the flag FLAG of PASS. The code calculator 340 may decrease the delay code DLC by 1 based on the flag of the PASS, to be determined as N/4−2. The code calculator 340 may transmit the delay code DLC to the recovery circuit 310.

The recovery circuit 310 may generate the first data DATA1 based on the delay code DLC of N/4−2 in the time point tq6. After the standby mode for stabilization, in a time period tq7 to tq8, the code calculator 340 may calculate the symbol values. The code calculator 340 may compare the symbol values and the reference value, confirm that the symbol values and the reference value coincide with each other, as the comparison result, and may generate the flag FLAG of FAIL. The code calculator 340 may increase the delay code DLC 1 based on the flag FLAG of FAIL and determine it as N/4−1. In an embodiment, the code calculator 340 may finally determine the delay code DLC as N/4−2 based on the flag FLAG of FAIL. The code calculator 340 may transmit the delay code DLC to the recovery circuit 310.

The recovery circuit 310 may generate the first data DATA1 based on the delay code DLC of N/4−1 in the time point tq8. After the standby mode for stabilization, in a time period tq9 to tq10, the code calculator 340 may calculate the symbol values. The code calculator 340 may compare the symbol values and the reference value, confirm that the symbol values does not coincide with the reference value, as the comparison result, and may generate the flag FLAG of PASS. The code calculator 340 may confirm that the flag FLAG is changed from FAIL to PASS, and may fix the delay code DLC. The code calculator 340 may finally determine the delay code DLC as N/4−1 based on the flag FLAG of PASS. The receiver 300 may change the state STATE to a completion PERIODIC_DONE at the time point tq10, and complete the delay code determining operation at the time point tq11, thereby completing the skew calibration.

Figure 10:
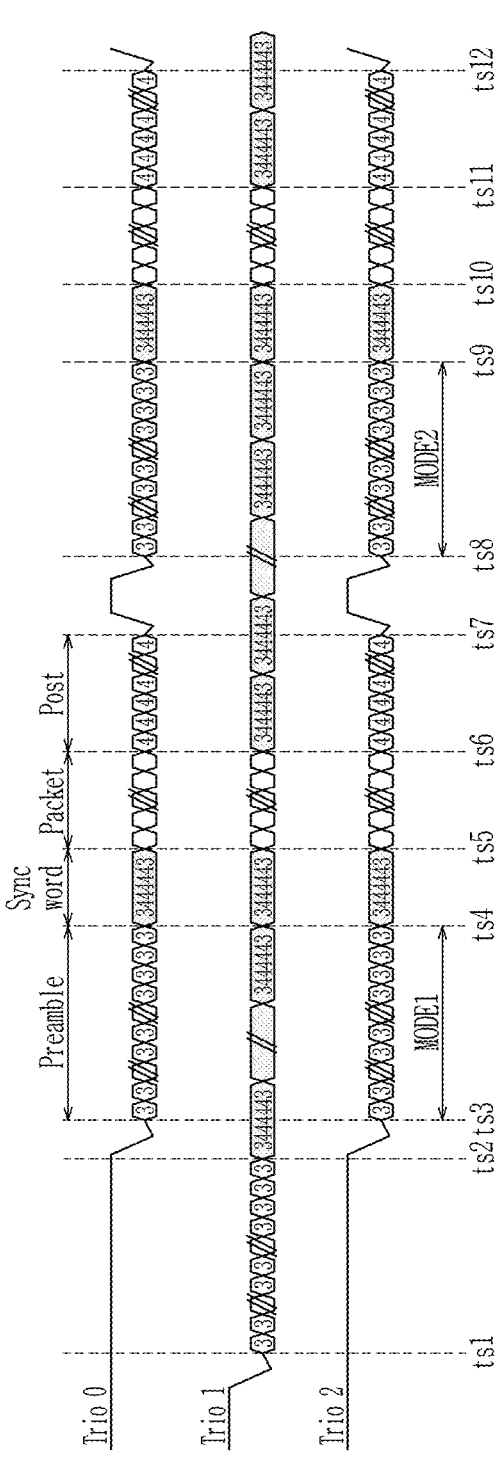
FIG. 10 illustrates an operation of a receiver in a continuous clock mode according to an embodiment.

FIG. 10 illustrates an operation of a receiver in a continuous clock mode according to an embodiment.

Referring to FIG. 10, the transmitter according to an embodiment may transmit the trio signals Trio 0, Trio 1, and Trio 2 to the receiver. The transmitter may generate the trio signals Trio 0, Trio 1, and Trio 2 by combining three phases and two polarities.

The receiver may receive the trio signals Trio 0, Trio 1, and Trio 2 through the wires. Each of the trio signals Trio 0, Trio 1, and Trio 2 may include three signals. When FIG. 3 is taken as an example, the signals DAT_A, DAT_B, and DAT_C may mean (or correspond to) one trio signal.

The transmitter may transmit trio signals Trio 0 and Trio 2 to the receiver in the non-continuous clock mode, and may transmit a trio signal Trio 1 to the receiver in the continuous clock mode. Regarding the trio signals Trio 0 and Trio 2, the description explained with reference to FIG. 7 may be equally applied to. Accordingly, redundant description will be omitted.

The trio signals Trio 0 and Trio 2 may exchange data during a time period ts3 to ts7 and a time period ts8 to ts12. For the trio signals Trio 0 and Trio 2, the time period ts3 to ts7 and the time period ts8 to ts12 exchanging data may be understood as the high-speed transaction section. For example, the time period ts3 to ts7 may be the first high-speed transaction section, and the time period ts8 to ts12 may be the second high-speed transaction section.

The trio signals Trio 0 and Trio 2 may include the preamble section, the sync word section, the packet section, the post section, or the like, in the time period ts3 to ts7 and the time period ts8 to ts12 exchanging data. During a time period ts7 to ts8, the receiver correspond to the trio signals Trio 0 and Trio 2 may be in the preparation mode (or the idle mode). The preparation mode may be understood as a standby mode for transmitting and receiving data.

In addition, the trio signal Trio 1 may have the preamble section during a time period ts1 to ts2. The trio signal Trio 1 may continuously include the sync pattern such as '3444443' after the preamble section.

The receiver may include first to third receiver circuits configured to receive the trio signals Trio 0, Trio 1, and Trio 2, respectively. The transmitter transfers the trio signal Trio 1 to the second receiver circuit of the receiver by using a clock lane (e.g., a first lane among a plurality of lanes), but the second receiver circuit may not know whether the first lane is the clock lane. The second receiver circuit may perform the skew calibration in the time period ts1 to ts2 in which the preamble section of the trio signal Trio 1. The second receiver circuit may determine the symbol values in the skew calibration, and may compare the symbol values and the reference value, and may generate the delay code based on the comparison result. In the same way, in a time period ts3 to ts4, the first and third receiver circuits may perform the skew calibration in which the preamble section of the trio signals Trio 0 and Trio 2, and may generate the delay code. The first to third receiver circuits may use a reference value of '3333333' in a comparison operation.

The first to third receiver circuits may determine the clock lane among the lanes transferring the trio signals Trio 0, Trio 1, and Trio 2. In an embodiment, the second receiver circuit may receive the sync pattern after the time period ts1 to ts2 of the preamble section. The second receiver circuit may continuously receive the sync pattern, and may determine that the first lane is the clock lane. The first and third receiver circuits may receive the sync pattern after the time period ts3 to ts4 of the preamble section, and may have the packet section after a time period ts4 to ts5, which is the sync word section. Since the clock lane continuously transfers the sync pattern, when the sync pattern is received twice, the second receiver circuit may determine the first lane as the clock lane. In an embodiment, in a time period ts6 to ts7, the receiver may detect that the second receiver circuit is in the sync word section whereas the first and third receiver circuits is in the post section. The receiver may confirm that only the second receiver circuit among the first to third receiver circuits is in a different section, and may determine the first lane corresponding to the second receiver circuit as the clock lane.

In an embodiment, in the time period ts7 to ts8, the receiver may detect that the second receiver circuit has not entered the preparation mode whereas the first and third receiver circuits are in the preparation mode (or the idle mode). The receiver may confirm that the second receiver circuit does not enter the preparation mode until a time point ts8, and may determine the first lane corresponding to the second receiver circuit as the clock lane.

The receiver may determine the clock lane by combining one or at least two of the above-described methods.

When the second receiver circuit corresponding to the clock lane among the first to third receiver circuits is detected, the receiver may change the reference value of the second receiver circuit. For example, since the clock lane continuously transfers the sync pattern such as the preamble section '3444443', the receiver may change the reference value of the second receiver circuit to '3444443'. In an embodiment, the second receiver circuit may change the reference value on its own. Accordingly, the accuracy of the skew calibration of the second receiver circuit may be improved.

The description of the time period ts3 to ts7 may be equally applied to the operation of the first and third receiver circuits in a subsequent high-speed transaction section ts8 to ts12. In addition, since the second receiver circuit also continues to receive the sync pattern, redundant description after the time point ts8 will be omitted.

Figure 11:
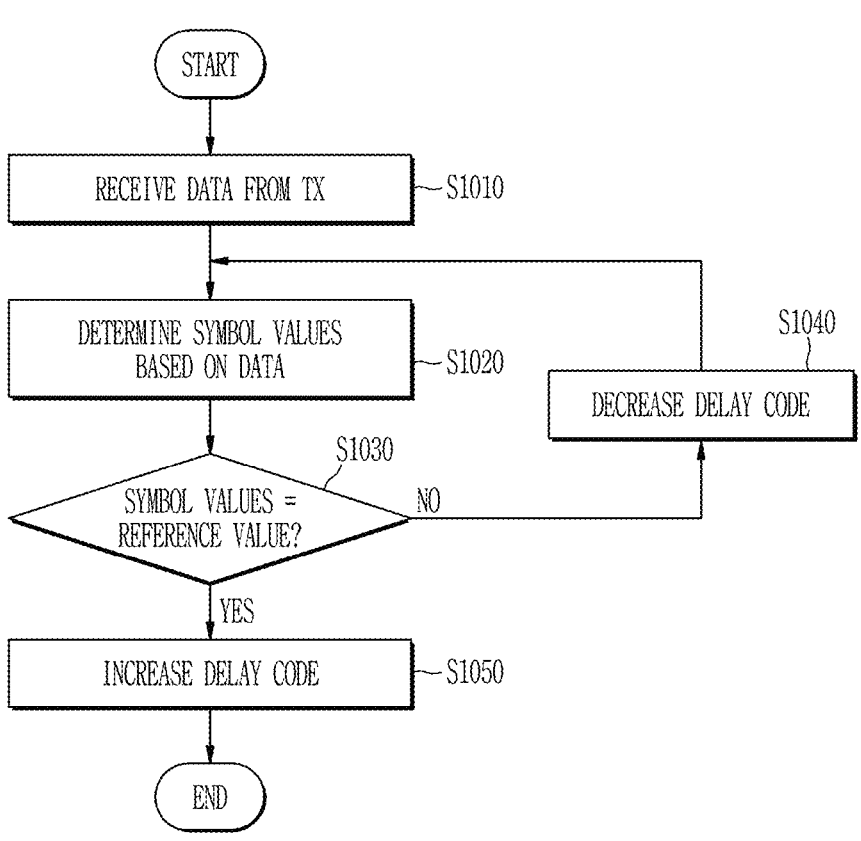
FIG. 11 illustrates a delay code determination method according to an embodiment.

FIG. 11 illustrates the delay code determination method according to an embodiment. Referring to FIG. 11, at operation S1010, the receiver according to an embodiment may receive data from the transmitter TX. The receiver may receive data having different phases through three wires. Data encoded in the transmitter and transferred through the communication channel may include skew due to various factors such as skin effect, dielectric loss, or the like. The receiver may perform the skew calibration for compensating the skew.

At operation S1020, the receiver may determine the symbol values based on data. The receiver may generate a differential signal from data. For example, the receiver may include first to third differential receivers. The first differential receiver may generate a first differential signal based on the amplitude difference of the first and second data, and the second differential receiver may generate a second differential signal based on the amplitude difference of the second and third data, and the third differential receiver may generate a third differential signal based on the amplitude difference of the third and first data.

The receiver may generate digital value based on the differential signal. For example, the receiver may output a digital value of 1 when the differential signal has a positive voltage, and may output a digital value of 0 when the differential signal has a negative voltage. The receiver may output a digital value of 3 bits based on the first to third differential signals. The receiver may determine the wire state based on the digital value of the 3 bits. As shown in FIG. 4, the receiver may determine the wire state as +x based on the digital value of the '100'.

The receiver may determine symbol value based on the transition of the wire state. As shown in FIG. 5, when the wire state transitions from +x to −y, the receiver may determine the symbol value as 3 (binary bit '011'). In an embodiment, the receiver may detect transitions of 7 times from data, and may calculate the seven symbol values corresponding to transitions of 7 times.

At operation S1030, the receiver may determine whether the symbol values coincide with the reference value. For example, the receiver may calculate the seven symbol values from the data of the preamble section, and may determine whether the seven symbol values coincide with the reference value '3333333'.

At operation S1040, the receiver may decrease the delay code when the symbol values does not coincide with the reference value. The receiver may determine the delay code in order to compensate the skew of the received data. In an embodiment, an initial delay code may be determined in advance and stored. In an embodiment, the receiver may determine the delay code by using the binary search code method. When the symbol values does not coincide with the reference value, the receiver may decrease the delay code by a multiple of ½. In an embodiment, the receiver may determine the delay code by using the counting method. When the symbol values does not coincide with the reference value, the receiver may decrease the delay code by 1. The receiver may increase the delay code and perform the step S1020. That is, the receiver may determine the symbol values again.

At operation S1050, the receiver may increase the delay code when the symbol values coincide with the reference value. In an embodiment, the receiver may increase the delay code by a multiple of 2. In an embodiment, the receiver may increase the delay code 1.

In an embodiment, when the symbol values coincide with the reference value, the receiver may revert the delay code to the previous delay code. In an embodiment, when the symbol values coincide with the reference value, the receiver may finally determine the delay code.

The receiver may perform skew compensation based on the finally determined delay code, and by determining the optimal delay code at each of the high-speed transaction, the speed may be improved by reducing the timing budget, and the current consumption may be reduced.

Figure 12:
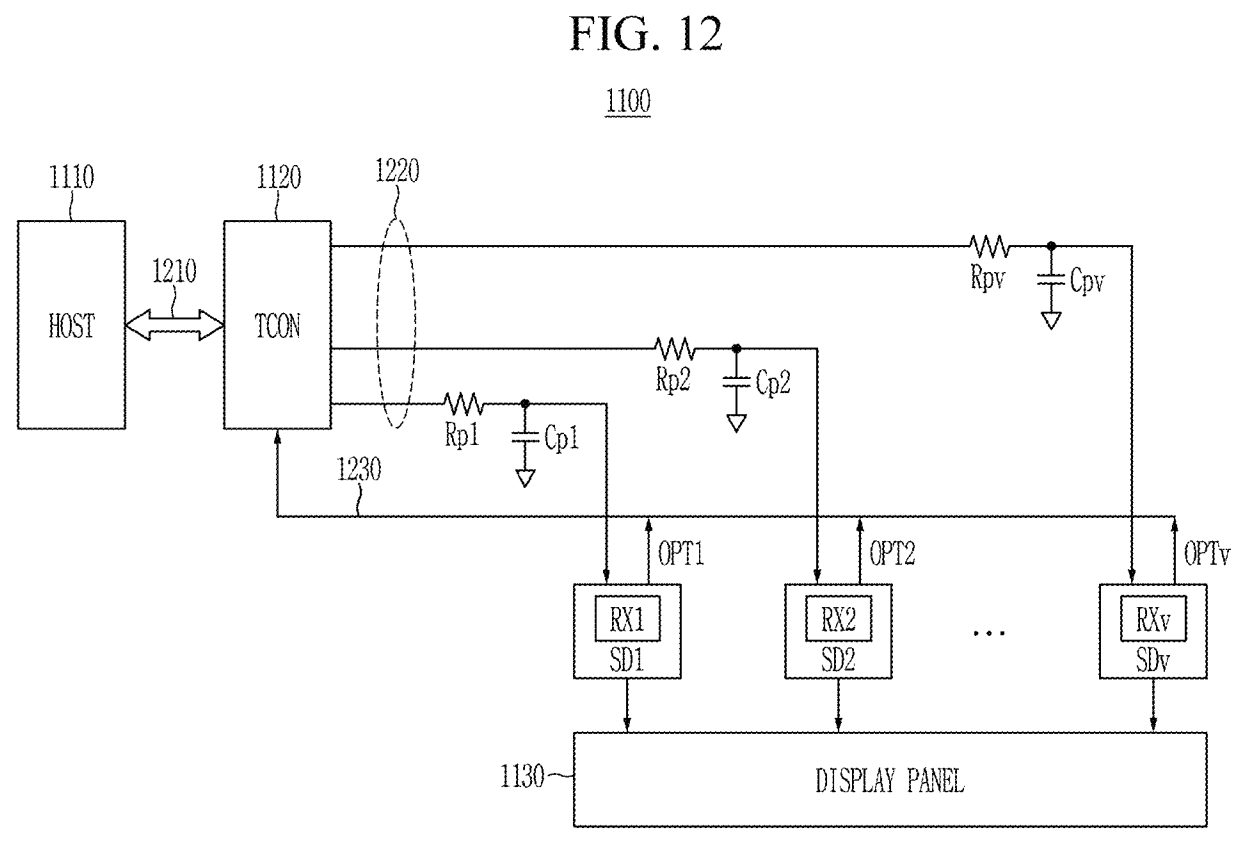

FIG. 12 illustrates an electronic system including the receiver according to an embodiment. FIG. 12 shows an electronic system 1100 including a display driving circuit. For better comprehension and ease of description, a display panel 1130 is shown together.

Referring to FIG. 12, display driving circuit may include a timing controller (TCON) 1120, a plurality of source drivers SD1 to SDv, data transmission channel 1220 and a shared back channel 1230.

The timing controller 1120 may transmit data to the plurality of source drivers SD1 to SDv. The data transmitted to the plurality of source drivers SD1 to SDv may be packet data including the display data. Each of the plurality of source drivers SD1 to SDv may drive one or more data line of the display panel 1130 based on the received data. For example, the display panel 1130 may be a large-scale display panel.

The timing controller 1120 may transmit and receive data with the plurality of source drivers SD1 to SDv through a high-speed serial interface method. An interface method between the timing controller 1120 and the plurality of source drivers SD1 to SDv may be referred to as an intra-panel interface.

In addition, the timing controller 1120 may transmit and receive data through a communication channel 1210 with a host device 1110 through a high-speed serial interface method. An interface method between the timing controller 1120 and the host device 1110 may be referred to as an inter-panel interface.

The timing controller 1120 may perform the skew calibration on the data of the host device 1110. For example, the configuration and operation of the receiver described with reference to FIG. 1 to FIG. 11 may be equally applied to the timing controller 1120. That is, the receiver may calculate the symbol values based on data of the preamble section received through the communication channel 1210, and may compare the symbol values and the reference value. The receiver may generate the optimal delay code based on the comparison result. Accordingly, as for the receiver, the speed may be improved by reducing the timing budget, and the current consumption may be reduced. In one embodiment, the receiver may be disposed outside timing controller 1120.

The timing controller 1120 may be connected to the plurality of source drivers SD1 to SDv in the point-to-point method, and may transmit data to each of the plurality of source drivers SD1 to SDv through different data transmission channel 1220. The timing controller 1120 may transmit data to respective source drivers through respective transmission channel.

Respective distances from the timing controller 1120 to the plurality of source drivers SD1 to SDv may be different from each other. Therefore, lengths of transmission channels 1220 may be different from each other, and parasitic resistances Rp1 to Rpv and parasitic capacitor (Cp1-Cpv) of each of the transmission channels 1220 may be different from each other.

Accordingly, since the impedance and frequency characteristics of the transmission channels 1220 may be different, the plurality of source drivers SD1 to SDv may perform a training to optimize the receiving operation depending on the impedance and frequency characteristics of corresponding transmission channel.

In more detail, each of the plurality of source drivers SD1 to SDv may optimize the receiving operation of the receivers RX1 to RXv by the training. In addition, each of the plurality of source drivers SD1 to SDv may determine parameter values OPT1 to OPTv of the receivers RX1 to RXv that optimize the receiving operation, and may transmit the parameter values OPT1 to OPTv to a timing controller 1120.

In an embodiment, in response to a read command received from the timing controller 1120, each of the plurality of source drivers SD1 to SDv may transmit the parameter values OPT1 to OPTv to the timing controller 1120.

Meanwhile, the plurality of source drivers SD1 to SDv may be connected to the timing controller 1120 in a multi-drop method through the shared back channel 1230. In an embodiment, the shared back channel 1230 may be configured as one signal line. The plurality of source drivers SD1 to SDv may sequentially transmit the parameter values OPT1 to OPTv to the timing controller 1120 through the shared back channel 1230. In addition, when an abnormal state related to the receiving operation, i.e., an abnormal reception state, occurs, at least one source driver among the plurality of source drivers SD1 to SDv may transmit a state information signal representing the abnormal state to the timing controller 1120 through the shared back channel 1230.

The electronic system 1100 according to an embodiment may include a first device including the transmitter circuit and a second device including the receiver generating the above-described the delay code.

In an embodiment, the first device may be the host device 1110 configured to output the display data to the communication channel 1210 as a transmission data, and the second device may be a display device configured to display an image based on the display data. In this case, the receiver the embodiment of the disclosure may be included in the timing controller 1120 of the display device.

In another embodiment, the first device may be the timing controller 1120, and the second device may be the source drivers SD1 to SDv of the display device. In this case, the receivers RX1 to RXv may be included in the source drivers SD1 to SDv.

Figure 13:
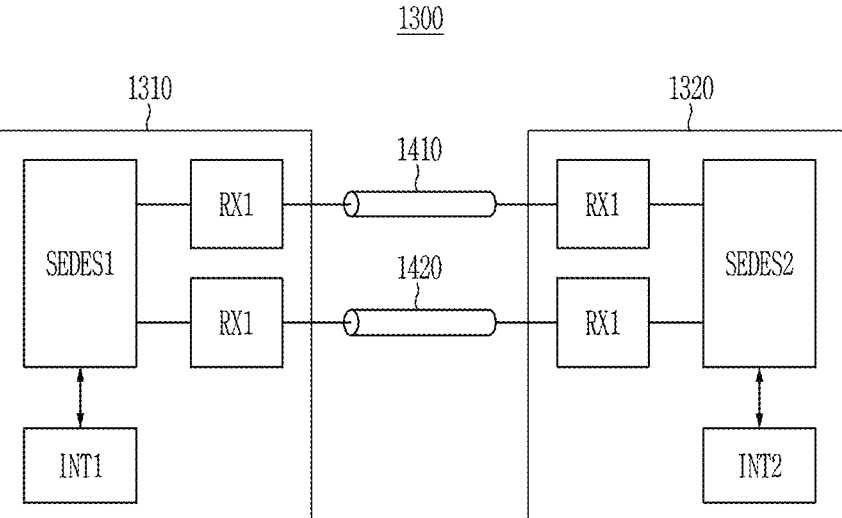
FIG. 13 illustrates an electronic system including a receiver according to an embodiment.

FIG. 13 illustrates an electronic system including the receiver, according to an embodiment. In particular, FIG. 13 illustrates a system performing bi-directional communications.

Referring to FIG. 13, an electronic system 1300 may include electronic devices 1310 and 1320. In one embodiment, each of the electronic devices 1310 and 1320 may be implemented as one of various electronic devices such as desktop computers, laptop computers, tablet computers, smart phones, display devices, wearable devices, servers, video game consoles, home appliances, medical devices.

However, the embodiment of the disclosure is not limited thereto, and in another embodiment, the electronic system 1300 may be implemented as a single electronic device. In such an embodiment, each of the electronic devices 1310 and 1320 may be a component or intellectual property (IP) included in a single electronic device, and may be implemented as an entity in the level of circuits, modules, chips, and/or packages. Terms such as a system and a device are employed to provide better understanding, and may not limit the embodiment of the disclosure.

The electronic devices 1310 and 1320 may communicate with each other, and may exchange data/signals through communication channels 1410 and 1420. Each of the communication channels 1410 and 1420 may include a conductive material to transfer data/signals. For example, each of the communication channels 1410 and 1420 may be implemented as a trace pattern on a printed circuit board (PCB), a lead wire of a cable, a metal pin/pad of a connector, or the like. Although FIG. 13 illustrates two unidirectional communication channels 1410 and 1420, In one embodiment, two unidirectional communication channels 1410 and 1420 may be integrated into one bi-directional communication channel.

The electronic device 1310 may include an internal circuit INT1, a serializer/deserializer SEDES1, the transmitter circuit TX1 and the receiver circuit RX1, which perform their functions. An electronic device 1320 may include an internal circuit INT2, a serializer/deserializer SEDES2, the transmitter circuit TX2 and the receiver circuit RX2, which perform their functions.

The internal circuits INT1 and INT2 may operate to provide the functions of the electronic devices 1310 and 1320, respectively. For example, the internal circuits INT1 and INT2 may configure various configuration elements or IPs such as a processor (e.g., central processing unit (CPU), application processor (AP), or the like), a memory, an image sensor, a display, or the like.

The electronic devices 1310 and 1320 may be implemented as separate components, IPs, or devices. Therefore, the electronic device 1310 may be an external device with respect to the electronic device 1320, and the electronic device 1320 may be an external device with respect to the electronic device 1310.

The serializer/deserializer SEDES1 may serialize the data generated according to operations the internal circuit INT1, and provide the serialized data to the transmitter circuit TX1. The transmitter circuit TX1 may transmit the serialized signal to the electronic device 1320 through the communication channel 1410. The receiver circuit RX2 may equalize the signal received through the communication channel 1410, and may recover clock and data based on the equalized signal. The serializer/deserializer SEDES2 may deserialize the signal provided from the receiver circuit RX2, and may provide the deserialize data.

In some embodiments, the serializer/deserializer SEDES2 may serialize the data generated according to operations the internal circuit INT2, and may provide serialized the data to the transmitter circuit TX2. The transmitter circuit TX2 may transmit the serialized signal to the electronic device 1310 through a communication channel 1420. The receiver circuit RX1 may equalize the signal received through the communication channel 1420, and may recover clock and data based on the equalized signal. The serializer/deserializer SEDES1 may deserialize the signal provided from the receiver circuit RX1, to provide the deserialize data.

In this way, the electronic devices 1310 and 1320 may exchange data/signals with each other through the communication channels 1410 and 1420. When the speed of communication between the electronic devices 1310 and 1320 increases (e.g., when the communication is performed at a higher frequency or bandwidth), the electronic devices 1310 and 1320 may exchange a larger amount of data per a unit time.

However, due to various factors such as a skin effect, a dielectric loss, or the like, each of the communication channels 1410 and 1420 may exhibit low-pass frequency response characteristics. Therefore, in a high-speed operation, bandwidths of the communication channels 1410 and 1420 may be limited, and may be smaller than the bandwidth of signals. This may attenuate high-frequency components of signals transferred through the communication channels 1410 and 1420, and may cause an inter-symbol interference (ISI) in the time domain. As a result, as the speed for transferring signals increases, the distortion of signals may increase, and the quality of signals may deteriorate.

In one embodiment, at least one among the receiver circuits RX1 and RX2 may perform the skew calibration in order to improve the quality of the received signals. At least one among the configuration and operation of the receiver described with reference to FIG. 1 to FIG. 11 may be equally applied to the receiver circuits RX1 and RX2. That is, the receiver circuits RX1 and RX2 may calculate the symbol values based on data of the preamble section received through the communication channels 1410 and 1420, and may compare the symbol values and the reference value. The receiver circuits RX1 and RX2 may generate the optimal delay code based on the comparison result. Accordingly, according to the receiver circuits RX1 and RX2, the speed may be improved by reducing the timing budget, and the current consumption may be reduced.

Figure 14:
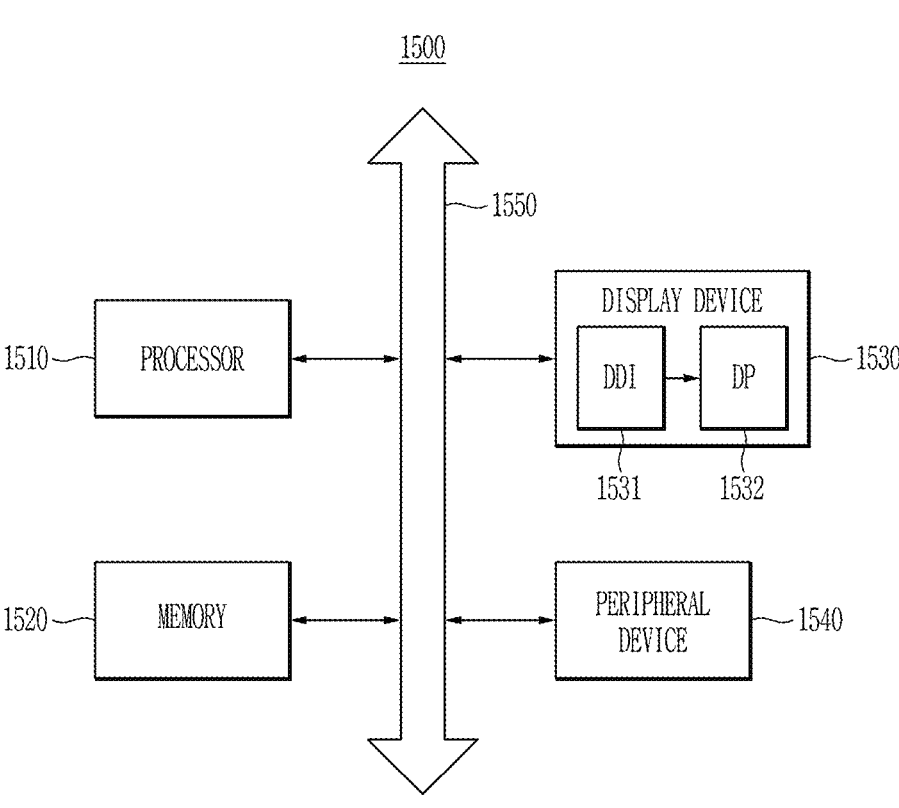
FIG. 14 illustrates a semiconductor system according to an embodiment.

FIG. 14 illustrates a semiconductor system according to an embodiment. Referring to FIG. 14, a semiconductor system 1500 according to an embodiment may include a processor 1510, a memory 1520, the display device 1530, and a peripheral device 1540, which are electrically connected to a system bus 1550. For example, the semiconductor system 1500 according to an embodiment may be a virtual reality system, for example, a display system capable of providing a virtual reality (VR) system, an augmented reality (AR) system, a mixed reality (MR) system, a hybrid reality system, or a partial combination and/or derivative system thereof. The virtual reality system may be implemented in various platforms including a head mounted display (HMD), a mobile device, a computing system, or other hardware platforms capable of providing virtual reality contents to at least one views.

The processor 1510 may control input/output of the data of the memory 1520, the display device 1530, and the peripheral device 1540, and may perform image processing of the image data transmitted between the devices. In some embodiments, the processor 1510 may correspond to one or more processors and the memory 1520 may correspond to one or more memory devices.

The display device 1530 may include a display driver IC (DDI) 1531 and a display panel (DP) 1532, and may store the image data applied through the system bus 1550 in a frame memory included inside a DDI 1531, to display it on the display panel 1532 afterwards.

The receiver described with reference to FIG. 1 to FIG. 11 may be integrated into the DDI 1531, to perform the skew calibration. That is, the receiver may calculate the symbol values based on data of the preamble section received through communication channel, and may compare the symbol values and the reference value. The receiver may generate the optimal delay code based on the comparison result. Accordingly, the receiver may improve the speed by reducing the timing budget, and may reduce the current consumption.

The peripheral device 1540 may be a device that converts motion pictures, such as a camera, scanner or webcam, or still images into electrical signals. Image data obtained through the peripheral device 1540 may be stored in the memory 1520 or displayed on the display panel 1532 in real time.

The memory 1520 may include volatile memory such as dynamic random-access memory (DRAM) and/or non-volatile memory such as flash memory. The memory 1520 may include DRAM, phase-change random access memory (PRAM), magnetic random-access memory (MRAM), resistive random-access memory (ReRAM), ferroelectric random-access memory (FRAM), NOR flash memory, NAND flash memory, and fusion flash memory (e.g., memory combined with static random-access memory (SRAM) buffer and NAND flash memory and NOR interface logic). The memory 1520 may store image data obtained from the peripheral device 1340 or image signals processed by the processor 1510.

The semiconductor system 1500 may be installed in mobile electronic products such as smartphones or tablets, but is not limited thereto, and may be installed in various types of electronic products that display images.

In some embodiments, each component or combinations of two or more components described with reference to FIG. 1 to FIG. 14 may be implemented as a digital circuit, a programmable or non-programmable logic device or array, an application-specific integrated circuit (ASIC), or the like.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A receiver device comprising:
a decoder configured to:
generate differential signals based on phase signals having different phases, and
generate a symbol value based on the differential signals;
a code calculator configured to:
compare the symbol value with a reference value, and
based on a result of comparing the symbol value with the reference value, generate a delay code; and
a recovery circuit configured to:
generate a recovery data by recovering the phase signals, and
based on the delay code, delay the recovery data.

2. The receiver device of claim 1, wherein, based on the symbol value that does not coincide with the reference value, the code calculator is configured to decrease the delay code.

3. The receiver device of claim 2, wherein, based on the symbol value that does not coincide with the reference value, the code calculator is configured to decrease the delay code by a multiple of ½.

4. The receiver device of claim 2, wherein, based on the symbol value that does not coincide with the reference value, the code calculator is configured to decrease the delay code by a predetermined value.

5. The receiver device of claim 1, wherein, based on the symbol value that coincides with the reference value, the code calculator is configured to fix or increase the delay code.

6. The receiver device of claim 1, wherein, based on the symbol value that coincides with the reference value, the code calculator is configured to generate a first delay code by increasing the delay code,
wherein, based on the symbol value that does not coincide with the reference value, the code calculator is configured to generate a second delay code by decreasing the delay code,
wherein the second delay code is subsequent to the first delay code, and
wherein the code calculator is configured to determine the second delay code as a final delay code.

7. The receiver device of claim 1, wherein the phase signals are signals of a preamble section; and
wherein the reference value is '3333333'.

8. The receiver device of claim 1, wherein the phase signals comprise a first phase signal, a second phase signal, and a third phase signal,
wherein the differential signals comprise a first differential signal, a second differential signal, and a third differential signal, and
wherein the receiver device further comprises:
a first differential receiver configured to generate the first differential signal based on a first difference of the first phase signal and the second phase signal;
a second differential receiver configured to generate the second differential signal based on a second difference of the second phase signal and the third phase signal; and
a third differential receiver configured to generate the third differential signal based on a third difference of the third phase signal and the first phase signal.

9. The receiver device of claim 1, wherein the recovery circuit comprises:
a data circuit configured to generate the recovery data based on the differential signals;
a clock circuit configured to generate a recovery clock based on the differential signals; and
a delay cell configured to generate a first data by delaying the recovery data based on the delay code.

10. The receiver device of claim 9, further comprising a deserializer configured to generate a second data by deserializing the first data based on the recovery clock,
wherein the decoder is configured to generate the symbol value based on the second data.

11. The receiver device of claim 10, wherein the recovery circuit is configured to:
transfer a first recovery data to the deserializer at a first time point, and
transfer a second recovery data to the deserializer at a second time point subsequent to the first time point,
wherein the code calculator is configured to perform a comparison operation by using a first symbol value generated based on the second recovery data, and
wherein a standby section for stabilization of the deserializer exists between the first time point and the second time point.

12. The receiver device of claim 1, wherein the code calculator is configured to:
generate a first delay code in a first high-speed transaction section, and
generate a second delay code in a second high-speed transaction section subsequent to the first high-speed transaction section.

13. The receiver device of claim 12, wherein the code calculator is configured to generate the first delay code by using a code fixing method or a binary search code method in the first high-speed transaction section.

14. The receiver device of claim 13, wherein the code calculator is configured to generate the second delay code by using a counting method based on the first delay code in the second high-speed transaction section.

15. A skew adjusting method comprising:
receiving a trio signal;
based on a reference value in a preamble section of the trio signal, determining a delay code;
determining whether the trio signal is a continuous clock mode; and
based on the trio signal that is the continuous clock mode, adjusting the reference value.

16. The skew adjusting method of claim 15, wherein the determining whether the trio signal is the continuous clock mode comprises, based on the trio signal that continuously receives a sync pattern, determining that the trio signal is the continuous clock mode.

17. The skew adjusting method of claim 15, further comprising receiving other two trio signals, wherein the determining whether the trio signal is the continuous clock mode comprises, based on the trio signal that has a different signal section from the other two trio signals, determining that the trio signal is the continuous clock mode.

18. The skew adjusting method of claim 15, further comprising receiving other two trio signals, wherein the determining whether the trio signal is the continuous clock mode comprises, based on the trio signal that does not enter a preparation mode until the other two trio signals enter the preparation mode, determining that the trio signal is the continuous clock mode.

19. The skew adjusting method of claim 15, further comprising, based on the trio signal that is a non-continuous clock mode, maintaining the reference value.

20. A skew adjusting method comprising:

receiving data from a transmitter;

determining symbol values based on the data;

determining whether the symbol values coincide with a reference value;

based on a result of determining whether the symbol values coincide with a reference value, generating a delay code;

decreasing the delay code based on the symbol values that do not coincide with the reference value, and increasing the delay code based on the symbol values that coincide with the reference value.

* * * * *